United States Patent [19]

Vander Meer et al.

[11] Patent Number: 4,809,965
[45] Date of Patent: Mar. 7, 1989

[54] SHEET TRANSFER DEVICE AND METHOD

[75] Inventors: Richard H. Vander Meer, Arvada; Ronald A. Pearce, Lakewood; Milton W. Kapke, Golden, all of Colo.

[73] Assignee: Goldco Industries, Inc., Loveland, Colo.

[21] Appl. No.: 60,973

[22] Filed: Jun. 16, 1987

Related U.S. Application Data

[63] Continuation of Ser. No. 735,756, May 20, 1985, abandoned.

[51] Int. Cl.⁴ .............................................. B65H 5/08
[52] U.S. Cl. ...................................... 271/11; 271/107; 271/194; 271/267; 414/793; 414/789.5; 414/927
[58] Field of Search ................... 271/5, 90, 11, 14, 91, 271/93, 106, 107, 194, 267; 198/421; 414/42, 71, 72, 70, 101

[56] References Cited

U.S. PATENT DOCUMENTS

| | | | |
|---|---|---|---|
| 2,626,038 | 1/1953 | Smith | 198/421 |
| 2,627,890 | 2/1953 | Lloyd | 271/267 X |
| 2,704,593 | 3/1955 | Galloway | 198/421 |
| 2,737,389 | 3/1956 | Evans | 271/107 X |
| 2,743,923 | 5/1956 | Watter | . |
| 2,953,883 | 9/1960 | Gentry | 271/107 X |
| 3,031,906 | 5/1962 | Holman | 414/101 X |
| 3,584,868 | 6/1971 | Fromm | 271/84 |
| 3,587,875 | 6/1971 | Carmody | . |
| 3,618,790 | 11/1971 | Carmody | . |
| 3,682,290 | 8/1972 | Von Gal, Jr. et al. | . |
| 3,797,822 | 3/1974 | Anderson | 271/107 X |
| 4,242,025 | 12/1980 | Thibault | 414/70 |
| 4,384,710 | 5/1983 | Gustafson | 271/107 X |
| 4,487,409 | 12/1984 | Orii | 271/107 X |
| 4,513,957 | 4/1985 | Schaefer | 271/91 X |
| 4,533,133 | 8/1985 | Hams | 271/11 X |

FOREIGN PATENT DOCUMENTS

1907763  1/1973  Fed. Rep. of Germany .

Primary Examiner—Richard A. Schacher
Attorney, Agent, or Firm—Robert E. Harris

[57] ABSTRACT

A sheet transfer device and method are disclosed for transferring sheets from a sheet stack to a utilization area such as a can pallet. A base unit causes pivoting of a beam about a moveable pivot point so that a sheet picked up from the sheet stack is moved upwardly for a substantial distance and then pivoted to a point above a can pallet, after which the sheet is moved downwardly and deposited on the upwardly extending tops of a horizontal layer of cans on the can pallet. Suction is supplied through a plurality of cups brought into engagement with the top sheet of a sheet stack to lift the top sheet from the stack, with the suction being terminated when the sheet is deposited on the can pallet to thereby release the sheet. Upward movement of the sheet from the sheet stack and downward movement of the sheet toward the can pallet is effected by use of a cam follower engaging contoured cam guides to force displacement of the pivot point of a transfer beam as needed to obtain the desired movement toward and away from the can pallet and sheet stack.

23 Claims, 4 Drawing Sheets

Fig_2

Fig_3   Fig_4

SHEET TRANSFER DEVICE AND METHOD

This application is a continuation of application Ser. No. 735,756, filed May 20, 1985, now abandoned.

FIELD OF THE INVENTION

This invention relates to a sheet transfer device and method, and, more particularly, relates to a device and method for transferring sheets from a stack of sheets to a utilization area such as a can pallet.

BACKGROUND OF THE INVENTION

Devices and methods have been heretofore suggested for moving, or transferring, various objects from one location to another, and such devices have included means for transferring relatively large sheets from place to place. In addition, devices are now known for applying suction to enable pick-up of objects.

It is also now known that sheets of paper, paper board, plastic and the like, can be placed between vertical layers of a stack of articles, such as cans, with such placement being accomplished manually or by a transfer device. Such devices have, however, been relatively cumbersome to date, have required that the sheets be moved by overhead devices, have been limited in use due to the amount of space required for sheet transfer and/or have required excessive use of critical space.

SUMMARY OF THE INVENTION

This invention provides an improved device and method for transferring sheets that is particularly useful for transferring sheets from a sheet stack to a utilization device, such as a can pallet. The device is relatively compact and withdraws and deposits sheets in a direction having a vertical component to thus require a minimum amount of critical space for sheet transfer.

It is therefore an object of this invention to provide an improved device and method for sheet transfer.

It is another object of this invention to provide an improved device and method for sheet transfer from a sheet stack to a utilization area, such as a can pallet.

It is still another object of this invention to provide an improved device and method for sheet transfer of each sheet from the top of a stack of sheets by application of suction for sheet pick-up and terminating suction application after deposit of the sheet on the top cans on a pallet.

It is still another object of this invention to provide an improved device for sheet transfer that is relatively compact and requires a minimum of space for sheet transfer.

It is yet another object of this invention to provide an improved device and method for sheet transfer that lifts each sheet upwardly and deposits each sheet downwardly to minimize critical space requirements for sheet transfer.

It is still another object of this invention to provide an improved device for sheet transfer that is automatic in operation.

With these and other objects in view, which will become apparent to one skilled in the art as the description proceeds, this invention resides in the novel construction, combination, arrangement of parts and method substantially as hereinafter described and more particularly defined by the appended claims, it being understood that changes are meant to be included as come within the scope of the claims.

DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figures 1, 10A, 10B:
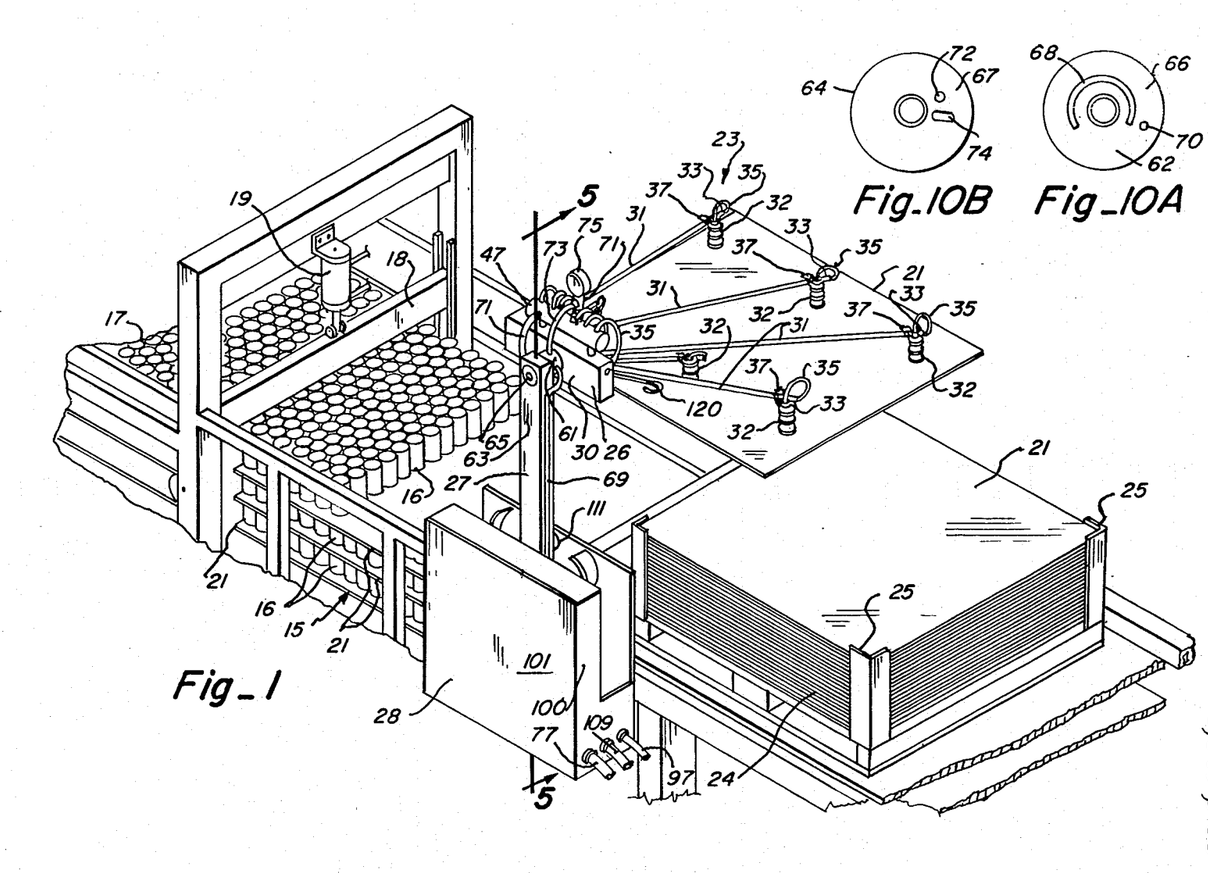
FIG. 1 is a perspective view of the sheet transfer apparatus of this invention shown in connection with transferring sheets from a sheet stack to a pallet receiving vertical layers of stacked cans and having a sheet placed between each of said layers.
FIGS. 10A and 10B are front views of the mating surfaces of the rotary valve controlling suction and air delivery for sheet pickup and release.

As shown in the perspective view of FIG. 1, a conventional can pallet 15 normally receives a plurality of cans 16 from an accumulating table 17 when can block arm 18 is drawn upwardly to a non-blocking position by cylinder/piston unit 19 to allow cans to thereafter be deposited side by side on the pallet with the cans tightly packed and engaging one another. As is well known, such can pallets normally include a plurality of vertically stacked layers in which the cans are positioned end to end, as is indicated in FIG. 1. When packed on the pallet, it is also conventional to place a thin sheet 21 (of paper, paper board, plastic or other suitable materials) between each vertically stacked layer of cans.

The sheet transfer device 23 of this invention transfers sheets from a first position to a second position, and, in particular, is well suited to transfer a sheet 21 from the top of sheet stack 24 (which sheets are maintained in a uniform stack, which may be accomplished, for example, by providing corner sheet positioners 25, as indicated in FIG. 1) to the top of each vertical layer of cans 16 (i.e., with the sheet in engagement with the upwardly extending ends of the cans, as shown in FIG. 1) on pallet 15 before the next layer of cans is deposited on the pallet.

As indicated in FIG. 1, transfer of sheets from the top of a sheet stack 24 to the top of cans on pallet 15 is complicated because of the changing heights between the top of the sheet stack and the tops of the cans on the pallet due to depletion of the sheets on the stack. While not specifically shown, it is also to be appreciated that the sheet transfer device could be used for other applications such as, for example, transferring of sheets from the top of a layer of cans to an accumulating area.

Figures 3, 4:
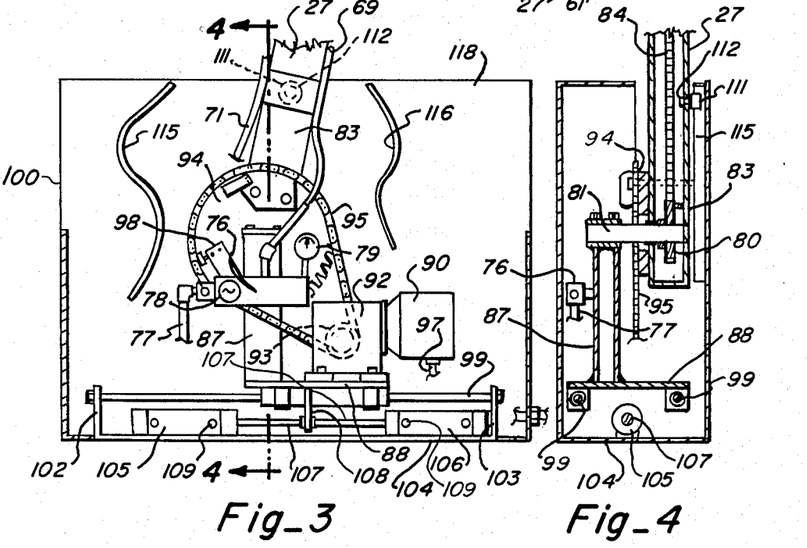
FIG. 3 is a front sectional view taken through lines 3—3 of FIG. 2.
FIG. 4 is a side sectional view taken through lines 4—4 of FIG. 3.

As best shown by the overall perspective view of FIGURE 1, sheet transfer device 23 includes a sheet engaging mechanism 26 pivotally mounted at one end of transfer beam 27. The other end of beam 27 is mounted for pivotal movement at movable drive unit 28, the details of which are best shown in FIGS. 3 and 4. Sheet transfer device 23 is mounted at one side of the path of travel of a sheet during sheet transfer with the drive unit thus being at one side and below at least a portion of the transfer path. The sheet transfer device can therefore be independently mounted, such as on a can handling mechanism.

Figure 2:
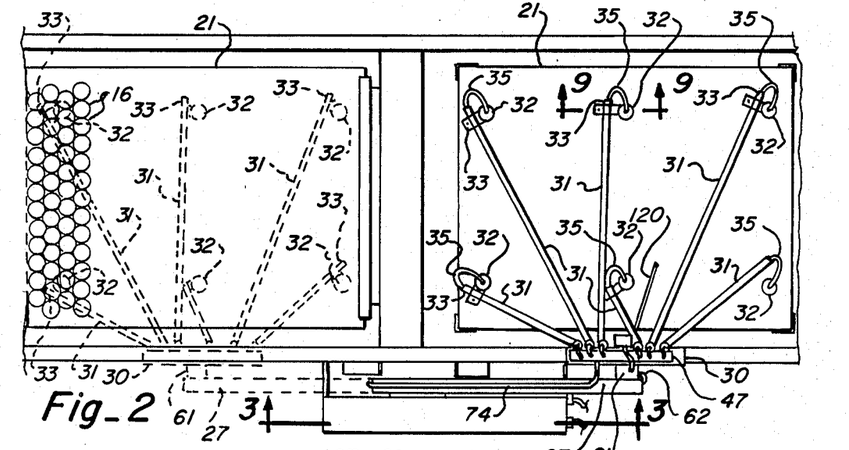
FIG. 2 is a top view of the sheet transfer apparatus of this invention, as shown in FIG. 1, illustrating positioning of the apparatus to pick up a sheet and deposit said sheet onto the top of a layer of cans.
Figures 5, 6, 7:
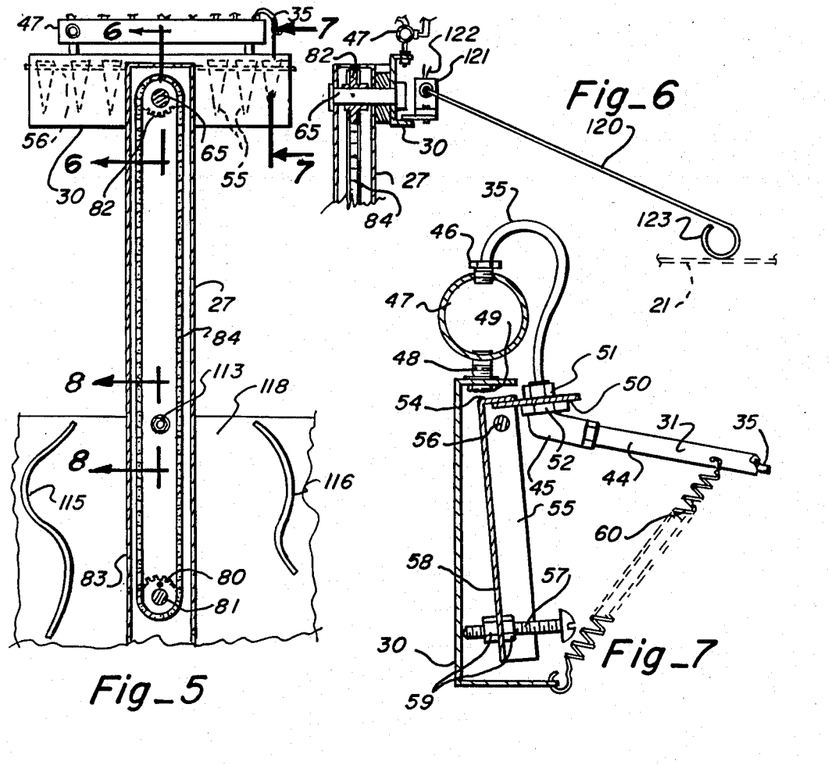
FIG. 5 is a front sectional view taken through lines 5—5 of FIG. 1.
FIG. 6 is a side sectional view taken through lines 6—6 of FIG. 5.
FIG. 7 is a side sectional view taken through lines 7—7 of FIG. 5.

Sheet engaging mechanism 26 includes, as best shown in FIGS. 1, 2 and 7, horizontally extending U-shaped support 30 having a plurality of arms 31 extending outwardly and somewhat downwardly therefrom with each of arms 31 having a downwardly facing suction element, or cup, 32 at, or near the free end 33 thereof. As brought out more fully hereinafter, support 30 is maintained in a horizontal position during the entire travel of beam 27 to effect sheet transfer.

Arms 31 are preferably of various lengths, as indicated in FIGS. 1 and 2, and suction elements 32 are positioned, as desired, at or near the free end 33 (i.e., at the end or inwardly thereof), so that suction elements 32 are brought into engagement with the top of a sheet at spaced positions with respect thereto. Such engagement is, however, preferably near each corner and near the edges of the central portion, as shown best in FIG. 2, and six arms and suction cups are thus illustrated, although the invention is not meant to be limited thereto.

Figure 9:
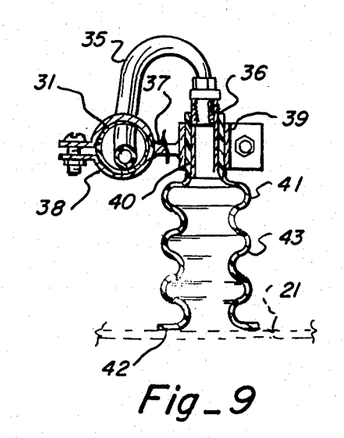
FIG. 9 is a front sectional view taken through lines 9—9 of FIG. 2.

Each arm 31 is formed of relatively rigid tubular material, preferably metal, and has a second tube 35 extending therethrough. One end of tube 35 extends from the free end 33 of the arms to the top of coupling 36 (see FIG. 9). Coupling 36 is mounted on or near the end 33 of arm 31 by means of bracket 37, which bracket has a tubing clamp 38 encircling arm 31 and a cup clamp 39 at coupling 36 so that one end 40 of suction cup, or element, 41 is clamped in sealing engagement around coupling 36 (as indicated in FIG. 9). Suction cup 41 is made of readily flexible material, such as rubber, for example, has an outwardly flaring lip 42 at the lower end for engaging the sheet, with an accordion-like central body portion 43 to allow the cup to be readily compressed, as needed, for good engagement with the top of a sheet.

As best shown in FIG. 7, end 44 of each arm 31 has a hollow elbow 45 thereon. Elbow 45 has tube 35 extending therethrough to coupling 46 at manifold 47, which manifold is secured at the top of support 30 by mounting stud 48 having nut 49 threaded thereon. In addition, elbow 45, preferably formed of a metal, is threaded and receives tab 50 thereat between nut 51 and washer 52. Tab 50 is secured (as by welding, for example) to the top end 54 of bracket 55, which bracket is mounted for pivotal movement with respect to support 30 by means of horizontally extending rod 56.

An adjustable, threaded, stop bolt 57, engageable at one end with support 30, is fastened to the narrowing bottom end 58 of bracket 55 by means of nuts 59 at the opposite side of bracket 55 so as to establish the maximum point of pivot of bracket 55 about rod 56 in the direction of downward movement of free end 33 of arm 31 toward a sheet and hence establishes the normal positioning of the arm with respect to support 30. Downward bias is applied to arm 30 by means of spring 60 which extends from arm 31 to the bottom of U-shaped support 30.

As best shown in FIGS. 1 and 10, upper rotary valve 61 is mounted on support 30 with rear portion 62 fixed to the upper end 63 of beam 27 and forward portion 64 mounted on pivot pin 65 so that forward portion 64 of rotary valve 61 pivots relative to rear portion 62. As indicated in FIGS. 10A and 10B, rear portion 62 of rotary valve 61 has face 66 which mates with face 67 of forward portion 64 for controlling application of a partial vacuum (or suction force) and air through manifold 47 and tubing 35 to cups 32, as needed, to pick up and release a sheet from the sheet stack.

As shown in FIG. 10A, face 66 has an arcuate slot 68 therein communicating with suction force supply line 69 (which line is mounted on the rear portion 62 of the rotary valve). In addition, face 66 has an aperture 70 located radially outwardly of slot 68 communicating with an air pressure supply line 71 (which line is also mounted on rear portion 62 of the rotary valve but maintained out of communication with the suction force supplied through line 69). As shown in FIG. 10B, face 67 has an aperture 72 thereon communicating with manifold 47 through tube 73 (which tube is mounted on formed portion 64 of the rotary valve), and a slot 74 spaced from aperture 72. As shown in FIG. 1, tube 73 may have a pressure indicator 75 connected therewith.

Aperture 72, when in communication with arcuate slot 68, supplies suction force to cups 32, except that when exhaust coupling slot 74 is brought into communication with slot 68 (as the faces pivot relative to one another as beam 27 is pivoted to transfer a sheet), the suction force to cups 32 is terminated and air pressure is introduced through line 71 to cups 32 (or, alternately, aperture 70 can merely exhaust the suction pressure).

Suction supply line 69 is connected with vacuum pump 76, which pump may be a conventional pump for receiving air pressure from a conventional source through line 77 and supply negative pressure (or suction force) with such pressures being indicated, for example, by indicators 78 and 79. Such a pump may be, for example, a PIAB Vacuum Pump sold by PIAB USA, Inc. of Hingham, Mass. Air pressure (or positive pressure) line 71 is connected to the positive air pressure side of pump 76 (or, alternately, directly to the incoming pressure source).

Transfer beam 27 has a lower sprocket 80 that is fixed relative to ground, with sprocket 80 being mounted on pivot pin 81. Beam 27 has an upper driven sprocket 82 mounted thereon with sprocket 82 having a planetary motion relative to pivot pin 81 as the lower portion 83 of beam 27 is pivoted about pin 81. Sprocket 82 is mounted on pivot pin 65 with the sprockets having an endless chain 84 extending therebetween, as shown in FIG. 5.

As indicated in FIG. 4, pivot pin 81 is mounted on upright 87 of moveable base, or platform, 88 having drive unit 28 mounted thereon. As indicated in FIGS. 3 and 4, vacuum pump 76 is also mounted on upright 87 with compressed air being supplied to pump 76 through tube 77 leading to an external source.

Pivoting of beam 27 is controlled by motor 90 of drive unit 28 mounted on and connected with gear box 92, which gear box is mounted on platform 88. Drive gear 93, at gear box 92, is connected to driven gear 94, mounted on pin 81, through endless chain 95. Sprocket 80 is freely mounted on pin 81 so that, when pin 81 rotates sprocket 80 is held fixed (i.e., does not rotate). Thus, as beam 27 is pivoted, chain 84 and sprockets 80 and 82 maintain support 30 horizontal regardless of beam orientation during sheet transfer. Power for electric motor 90 is provided through electrical conduit 97, and a cam 98 is provided on gear 94 to cause switch actuation (not shown) to reverse the motor drive to thereafter cause pivoting of beam 27 in the clockwise direction.

Platform 88 is moveable along guide rods 99 (within and extending toward side walls 100 of cover box 101) held by mounts 102 and 103 which extend upwardly from the bottom 104 of the device. When so mounted, platform 88 is moveable in reciprocal directions in a straight path in (or parallel to) the plane of movement of beam 27 (i.e., toward and between sheet stack 24 and can pallet 15).

A pair of pneumatic cylinders 105 and 106 are positioned along base 104 and each has a piston rod 107 extending therefrom with the end of each rod engaging depending tab 108, connected with platform 88, at opposite sides of the tab to thus push thereagainst. Cylinders 105 and 106 are connected with an external air source through tube 109 so that the cylinder/piston arrangement act as air springs (i.e., biases rod 107 to the outermost position with respect to the cylinder) to maintain platform 88 centrally positioned except when displaced by cam actuation as brought out hereinafter.

Figure 8:
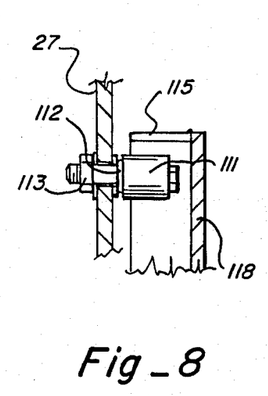
FIG. 8 is a side sectional view taken through lines 8—8 of FIG. 5.

Cam follower 111 is mounted for free rotation on pin 112, which pin is secured to beam 27, above lower pivot 81 by means of nut 113, as indicated in FIG. 8.

Cam follower 111 is engageable with cam guides, or surfaces, 115 and 116 on back support wall 118. As best shown in FIGS. 3 and 5, cam guides 115 and 116 are contoured in a manner such that, as beam 27 is pivoted, from a first position where the sheet engaging means is adjacent to the sheet stack, to a second position, where the sheet engagement means is adjacent to the pallet, platform 88 is displaced by the cam guides to assure that a sheet picked up from the sheet stack is moved upwardly from the stack and is lowered downwardly toward the pallet.

The camming arrangement thus adjusts the effective length of the beam to enable the required movement upwardly and downwardly. As can be appreciated, the cam surfaces 115 and 116 are contoured as needed to effect the desired upward and downward movement of the sheet, with such movement including a vertical component. If desired, of course, the upward and downward movement could be in vertical directions. It should also be appreciated that other means could be utilized to adjust the effective length of beam 27, such as, for example, by providing a telescoping arm and controlling the amount of telescoping as needed.

As best shown in FIG. 6, sensor rod 120 extends outwardly and downwardly from switch 121 mounted on support 30. Switch 121 is connected by leads 122 to motor 90 to cause drive reversal of the electric motor when end 123 of sensor 120 comes into contact with sheet 21 on sheet stack 24.

Figure 11:
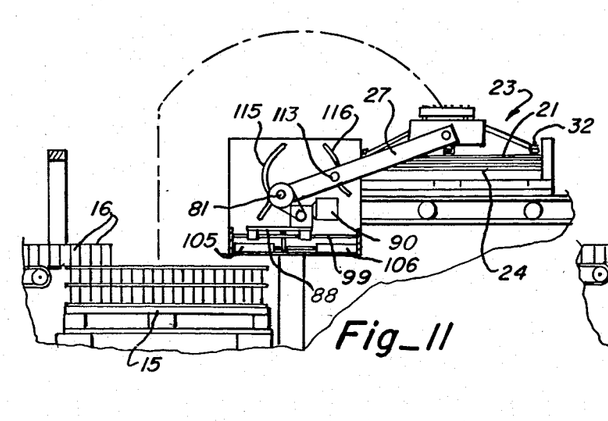
FIGS. 11 through 14 are partial front views of the device shown in FIG. 1 and illustrating operation of the device during transfer of sheets from a sheet stack to a can pallet.

Operation of the device of this invention is shown in connection with FIGS. 11 through 14. As indicated in FIG. 11, when sheet engaging mechanism 23 is positioned adjacent to sheet stack 24, the suction force supplied to suction cups 32 causes the top sheet 21 to be lifted from the sheet stack. At this time, beam 27 has been pivoted clockwise (as viewed in FIG. 11) and cam follower 111 is in engagement with cam guide 116 to force lower beam pivot 81 to the maximum left position by moving platform 88 to the left along guide rods 99 (as viewed in FIG. 11).

As beam 27 is moved in a counterclockwise direction upwardly away from sheet stack 24, a short delay is preferably introduced to allow a sheet below top sheet 21 in stack 24 to settle and thus break the natural vacuum between the sheets. This assures that only a single sheet is transferred. During movement of the beam in the counterclockwise direction away from the sheet stack, the camming arrangement (cam follower 111 and cam guide 116) moves platform 88, as needed, so that upward movement of the sheet has a vertical component until the end of engagement of cam follower 111 with cam surface 116.

Figure 12:
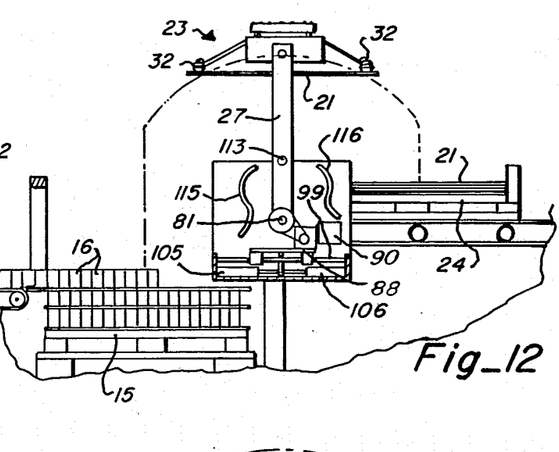

After the beam has been sufficiently pivoted in the counterclockwise direction so that cam follower 111 no longer engages cam surface 116, cylinder 105 drives the platform to the center portion so that pivot 81 is centrally positioned during the mid-portion of travel of beam 27 (which beam is shown vertically positioned in FIG. 12).

Figure 13:
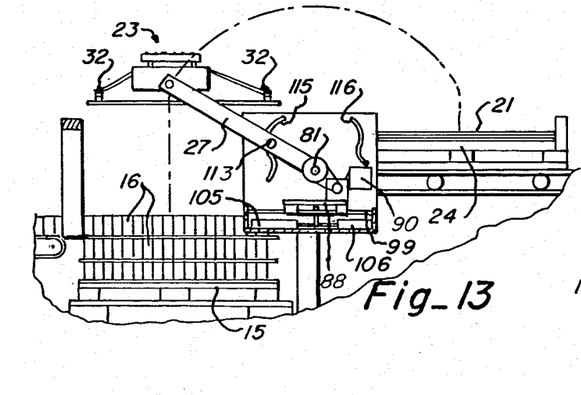

As the beam is moved still further in the counterclockwise direction (i.e., toward the can pallet), cam follower 111 is brought into engagement with cam guide 115 to assure lowering of the sheet downwardly toward the can pallet by displacing the platform to the right (as viewed in FIG. 13), and thus moving the pivot point 81 of the beam to the right (as also indicated in FIG. 13).

Figure 14:
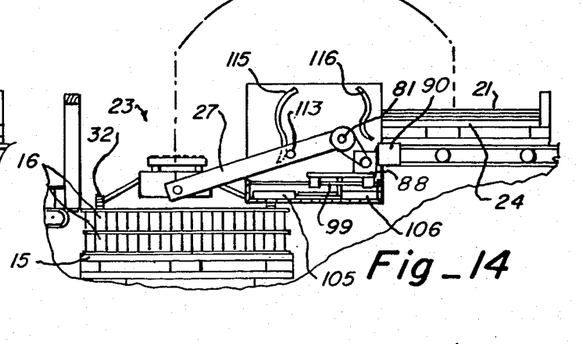

When the beam has been pivoted sufficiently in the counterclockwise direction so as to be adjacent to the top layer of cans on the can pallet, cam follower 111 is still engaged with cam guide 115 to assure that the sheet is accurately deposited on the upwardly facing ends of the top layer of cans 16 on pallet 15, as indicated in FIG. 14. At this point, the suction on cups 32 is terminated by the rotation of face 62 relative to face 64 of rotary valve 61, and this releases sheet 21 from the sheet engaging mechanism 23. As indicated by FIG. 10, a slight puff of air is preferably introduced to the cups 32 at termination of the suction force to further assure sheet release.

After release of the sheet, the direction of drive of motor 90 is reversed by cam 98 on gear 94 to drive the transfer beam in a clockwise direction back to a position adjacent to the top of sheet 21 of sheet stack 24. As sensor 120 engages sheet 21, switch 121 is actuated to again reverse the direction of drive of motor 90 and thus stop the clockwise pivoting motion of beam 27. The device is then ready to initiate the next cycle.

The timing of sheet transfer is coordinated with the speed that cans are conveyed to the can pallet and deposited thereon so that a sheet is applied to the pallet after the horizontal layer is filled with cans positioned side by side and the pallet lowered (which lowering can be sensed (as by an electrical switch (not shown)) and a signal sent to the sheet engaging mechanism to start a new cycle).

As can be appreciated from the foregoing, this invention provides an improved device and method for transferring sheets from one position to another, and, more particularly from a stack of sheets to a utilization area, such as a can pallet.

What is claimed is:

1. A sheet transfer device for transferring a sheet from a first predetermined position to a second predetermined position that is spaced with respect to said first predetermined position, said device comprising:

sheet engaging means for engaging a sheet at said first predetermined position and thereafter releasably maintaining said sheet in engagement with said sheet engaging means;

transferring means having a base portion, a moveable beam and control means, said base portion including pivot means having said movable beam pivotably mounted thereon at a position spaced from said sheet engaging means so that said pivot means is substantially immovable in a vertical direction, said moveable beam being connected with said sheet engaging means to cause said sheet engaging means to be moved from said first predetermined position to said second predetermined position while said control means determines the effective length of said movable beam to thereby enable such movement to include substantially linear movement of said connection between said movable beam and said sheet engaging means in a substantially vertical direction away from said first predetermined position for a substantial distance during a first portion of said movement, movement of said connection between said movable beam and said sheet engaging means having a horizontal component during a second portion of said movement, and substantially linear movement of said connection between said movable beam and said sheet engaging means in a substantially vertical direction toward said second predetermined position for a substantial distance during a third portion of said movement, said moveable beam of said transferring means moving in a substantially vertical plane during said movement of said sheet engaging means from said first predetermined position to said second predetermined position; and releasing means for causing said sheet to be released from said sheet engaging means when said sheet has been moved by said sheet engaging means to said second predetermined position.

2. The device of claim 1 wherein said sheet engaging means includes an elongated support, a plurality of arms extending from said support, and a plurality of sheet engagers connected with said arms for engaging said sheet at a plurality of spaced points thereon.

3. The device of claim 2 wherein each of said plurality of arms of said sheet engaging means is mounted for pivotal movement in a substantially vertical path so that said arms can be readily deflected when an obstacle is encountered.

4. The device of claim 2 wherein said transferring means includes means for maintaining said elongated support in a substantially horizontal position regardless of the orientation of said moveable beam of said transferring means.

5. The device of claim 1 wherein said control means includes cam means connected with said movable beam to cause displacement of said pivot means to thereby determine the effective length of said movable beam.

6. The device of claim 5 wherein said control means includes biasing means for biasing said pivot means to a predetermined central position when not displaced by said cam means.

7. The device of claim 1 wherein said releasing means includes sensing means for sensing the positioning of said sheet engaging means adjacent to said second predetermined position, and release means connected with said sensing means for releasing said sheet when said sheet is sensed to be positioned at said second predetermined position.

8. The device of claim 1 wherein said first predetermined position of said sheet is adjacent to the top of a stack of sheets, wherein said second predetermined position is adjacent to the top of a can pallet, wherein said sheet engaging means engages the top sheet of said sheet stack as said sheet to be transferred, and wherein said movable beam moves said top sheet from said sheet stack to the top of cans on said can pallet.

9. A transfer device for transferring a sheet from a first predetermined position to a second predetermined position that is spaced with respect to said first predetermined position, said device comprising:

sheet engaging means including a plurality of arms each of which has suction effecting means mounted thereon to contact said sheet at said first predetermined position;

suction force supply means including valving means and distribution means for supplying suction force to said suction effecting means through said valving means;

transferring means having a base portion, a moveable beam pivotably connected to said base portion so that said pivotable connection is substantially immovable in a vertical direction and control means for determining the effective length of said movable beam, said movable beam being connected with said sheet engaging means to cause said sheet engaging means to be moved from said first predetermined position to said second predetermined position with said control means enabling such movement of said sheet engaging means to include substantially linear movement in a substantially vertical direction away from said first position for a substantial distance and substantially linear movement in a substantially vertical direction toward said second predetermined position for a substantial distance, said base portion of said transferring means being below the level of at least a portion of said path of movement of said sheet, and said moveable beam of said transferring means moving in a substantially vertical plane during said movement of said sheet engaging means from said first predetermined position to said second predetermined position; and a control unit connected with said valving means for causing said suction force to be applied to said suction effecting means when said suction effecting means is in contact with said sheet at said first predetermined position to thereafter releasably maintain said sheet in engagement with said sheet engaging means and for causing said sheet to be released from said sheet engaging means when said sheet has been moved by said sheet engaging means to said second predetermined position.

10. The device of claim 9 wherein each of said suction effecting means has an application area, and wherein each of said suction effecting means is mounted on said arms to maintain a substantially constant directional orientation of said application areas throughout said movement of said transferring means.

11. The device of claim 10 wherein said device includes base means having said base portion of said transferring means mounted thereon and support means for movably mounting said base means thereon so that said base means is moveable in opposite directions substantially parallel to said plane of pivotal movement of said movable beam, and wherein said control means includes cam means for controlling movement of said base means relative to said support means during at least a portion of said pivotal movement of said movable beam, so that a sheet transferred by said sheet engaging means from said first predetermined position to said second predetermined position is moved along a preselected path during said cam controlled portion of said pivotal movement of said movable beam, and biasing means connected with said base means and said support means to bias said base means to a predetermined central position when the position of said base means is not being controlled by said cam means.

12. The device of claim 11 wherein said first predetermined position is at a sheet stack, wherein said second predetermined position is at a can pallet, and wherein said device is caused to repeatedly transfer sheets from the top of said sheet stack to the top layer of cans on said can pallet after each layer of cans has been deposited on said pallet.

13. A transfer device for transferring a sheet from the top of a sheet stack to the tops of a layer of cans on a can pallet, said device comprising:
   sheet engaging means having an elongated support, a plurality of arms extending from said support, a plurality of suction cups each of which is mounted on a different one of said arms to contact said sheets at predetermined spaced points, a manifold mounted on said support, and first tube means connected between said manifold and said suction cups;
   suction force supply means;
   valving means;
   second tube means connecting said suction force supply means to said manifold means through said valving means;
   a transfer beam having said sheet engaging means mounted on one end portion thereof;
   platform means;
   pivot means mounting the other end of said transfer beam on said platform means so that said beam can pivot in a path such that said sheet engaging means is positionable over said sheet stack and said can pallet at opposite maximum pivoting positions of said transfer beam;
   support means having said platform means movably mounted thereon so that said platform means is moveable in opposite directions in a path toward and away from said sheet stack and said can pallet;
   camming means having a cam follower mounted on said transfer beam and cam guides mounted on said support means for engaging said cam during at least a portion of said pivotal movement of said transfer beam, said cam guides being contoured so that when said cam follower is in engagement with said cam guides said platform is displaced due to pivoting of said transfer beam to thereby control the effective length of said transfer beam and thereby cause predetermined movement of said sheet away from said sheet stack and toward said can pallet;
   biasing means connected with said base means and said platform means to cause movement of said pivot means to a predetermined central position when said cam follower is out of engagement with said cam guides; and
   drive means for causing pivoting said transfer beam to thereby transfer said sheet from said sheet stack to said can pallet.

14. The device of claim 13 wherein said arms are pivotally mounted on said support so that said arms can be readily pivoted upwardly when encountering obstacles.

15. The device of claim 13 wherein said drive means includes means for maintaining said support substantially horizontal regardless of the orientation of said transfer beam.

16. A method for transferring a sheet from one predetermined position to a second predetermined position using a transferring means having a variable effective length arm and a base, said arm being pivotably connected to said base at one end thereof with said pivotable connection between said arm and said base being substantially immovable in a vertical direction, said method comprising:
   gripping a sheet to be transferred from said first predetermined position to said second predetermined position by movement of said arm of said transferring means;
   pivoting said arm of said transferring means while controlling the effective length thereof to cause movement of said sheet substantially linearly in a substantially vertical direction upwardly from said first predetermined position for a substantial distance;
   pivoting said arm of said transferring means to move said sheet through a substantially vertically oriented arc after completing said upward movement to a point over said second predetermined position;
   pivoting said arm of said transferring means while controlling the effective length thereof to cause movement of said sheet substantially linearly in a substantially vertical direction downwardly a substantial distance after said sheet has been moved through said arc to deposit said sheet at said second predetermined position; and
   releasing said sheet after deposit at said second predetermined position.

17. The method of claim 16 wherein said method includes gripping said sheet by utilizing a plurality of suction cups and applying a suction force within said cups, and wherein said releasing of said sheet includes terminating said suction force and applying air pressure to said cups.

18. The method of claim 17 wherein said step of controlling the effective length of said arm includes displacing said pivotable connection utilizing camming means during at least a portion of said substantially linear movements of said sheet.

19. The method of claim 16 wherein said transfer of said sheet is from a sheet stack to a can pallet.

20. A method for transferring a sheet from a sheet stack to a can pallet, said method comprising:
   providing a suction force;
   opening valving means to apply said suction force to a plurality of cups mounted on a plurality of arms, at least one of said plurality of arms having a length different than the length of the remaining said plurality of arms, said cups being engageable at spaced points with the top sheet of a sheet stack to releasably grip said sheet under the influence of said suction force;

lifting said gripped sheet so that said sheet is moved substantially linearly in a substantially vertical direction for a substantial distance;

moving said gripped sheet through a substantially vertically oriented arc to a position over said can pallet;

lowering said gripped sheet so that said sheet is moved substantially linearly in a substantially vertical direction to a position adjacent to the tops of a layer of cans on said can pallet;

closing said valving means to terminate said suction force on said cups to thereby release said sheet onto the tops of said layer of cans at said can pallet; and returning said cups to a position adjacent to the top of said sheet stack.

21. The method of claim 20 wherein said cups are mounted at the end of portions of tubes mounted on one end portion of a beam, with each of said cups having an open end and with said open ends being maintained in a substantially constant directional orientation throughout said lifting, moving, lowering and returning of said one end portion of said beam, and with the other end portion of said beam being pivoted on a displaceable pivot, and wherein said pivot is displaced to cause said beam to move said sheets in said substantially vertical directions.

22. The method of claim 21 wherein said pivot is displaced by providing camming means, and wherein said pivot is biased to a predetermined central position when not displaced by said camming means.

23. The method of claim 20 wherein said method includes causing each of said steps to be automatically repeated in conjunction with deposit of a layer of cans on said can pallet whereby said pallet is automatically filled with vertical layers of upright cans with each of said vertical layers having a sheet therebetween.

* * * * *